US006772408B1

(12) United States Patent
Velonis et al.

(10) Patent No.: US 6,772,408 B1
(45) Date of Patent: Aug. 3, 2004

(54) EVENT MODEL USING FIXED-FORMAT TEXT STRINGS TO EXPRESS EVENT ACTIONS

(75) Inventors: John Velonis, Dobbs Ferry, NY (US); Rituraj Deb Nath, Stamford, CT (US)

(73) Assignee: Hyperion Solutions Corporation, Sunnyvale, CA (US)

( * ) Notice: Subject to any disclaimer, the term of this patent is extended or adjusted under 35 U.S.C. 154(b) by 572 days.

(21) Appl. No.: 09/718,435

(22) Filed: Nov. 22, 2000

(51) Int. Cl.[7] ................................................. G06F 9/44
(52) U.S. Cl. ..................... 717/100; 717/101; 717/102; 717/103; 717/106; 717/108; 717/109; 709/223; 709/224; 345/763
(58) Field of Search ............................... 717/100, 101, 717/102, 103, 106, 109, 108; 709/318, 201, 205, 223, 100, 202, 224; 707/103 R; 345/763; 715/507

(56) References Cited

U.S. PATENT DOCUMENTS

| | | | | |
|---|---|---|---|---|
| 5,485,569 A | * | 1/1996 | Goldman et al. ............ | 715/507 |
| 5,537,630 A | * | 7/1996 | Berry et al. ................. | 345/763 |
| 5,724,589 A | * | 3/1998 | Wold .......................... | 719/318 |
| 5,822,583 A | * | 10/1998 | Tabuchi ...................... | 709/100 |
| 6,038,395 A | * | 3/2000 | Chow et al. ................. | 717/105 |
| 6,055,541 A | * | 4/2000 | Solecki et al. .......... | 707/103 R |
| 6,131,118 A | * | 10/2000 | Stupek et al. ............... | 709/223 |
| 6,144,991 A | * | 11/2000 | England ...................... | 709/205 |
| 6,185,728 B1 | * | 2/2001 | Hejlsberg .................... | 717/109 |
| 6,268,852 B1 | * | 7/2001 | Lindhorst et al. ........... | 345/744 |
| 6,292,824 B1 | * | 9/2001 | Siksa .......................... | 709/202 |
| 6,463,578 B1 | * | 10/2002 | Johnson ...................... | 717/124 |
| 6,484,149 B1 | * | 11/2002 | Jammes et al. ............... | 705/26 |
| 6,505,245 B1 | * | 1/2003 | North et al. ................. | 709/223 |
| 6,523,027 B1 | * | 2/2003 | Underwood ................... | 707/4 |
| 6,526,442 B1 | * | 2/2003 | Stupek, Jr. et al. ......... | 709/224 |
| 6,526,566 B1 | * | 2/2003 | Austin ........................ | 717/109 |
| 6,601,233 B1 | * | 7/2003 | Underwood ................. | 717/102 |
| 6,615,231 B1 | * | 9/2003 | Deen et al. ................. | 709/201 |

OTHER PUBLICATIONS

Title: An Interface between JAVA and APL, author: Symes, ACM, Jun., 2000.*
Title: On Views and XML, author: Abiteboul, ACM, Dec., 1999.*
Title: End to End Performance Modeling of Web Sewer Architectures, author: R. Hadharan et al, ACM, Sep. 2000.*
Title: An Interface Between Java and APL, author: Mike Symes, ACM, Jun. 2000.*
JavaBeans™ Specification, Version 1.01, Sun Microsystems Inc., Jul. 24, 1997 (114 pages).

* cited by examiner

Primary Examiner—Chameli C. Das
(74) Attorney, Agent, or Firm—Barry R. Lipsitz; Douglas M. McAllister (57) ABSTRACT

The present invention relates to computer software for initiating actions in response to user input, e.g., on an Internet web page. More particularly, the invention provides an improved event model comprising software components (designated "Fidgets" herein) which use fixed-format text strings to express event actions in a content delivery subsystem. In particular, the present invention provides a method for setting the event target property for a user event without the need to recompile software.

16 Claims, 3 Drawing Sheets

EVENT MODEL USING FIXED-FORMAT TEXT STRINGS TO EXPRESS EVENT ACTIONS

BACKGROUND OF THE INVENTION

The present invention relates to computer software for initiating actions in response to user input, e.g., on an Internet web page. More particularly, an improved event model is provided using software components (designated "Fidgets" herein) which use fixed-format text strings to express event actions in a content delivery subsystem. In particular, the present invention provides a method for setting the event target property for a user event without the need to recompile software.

A fidget is a new type of software component defined by the present invention which can be implemented, e.g., as a front-end component (user interface) in an Internet application or the like. A fidget encapsulates some meaningful end-user functionality, which is more than just a simple control. A fidget has a server side component (for example, a JAVABean ™) and a client side component (for example, hypertext markup language (HTML), JavaScript™ code, a JAVA applet, or the like). Fidgets are created by an author referred to herein as an "extender."

A fidget is part of a page, which page may contain other fidgets, as well as non-fidget information (e.g., static text and/or images). The page may be a Java Server page (JSP), which is a physical file residing on a server, or a virtual file which is constructed at run-time by a servlet or other server-side program. A page is constructed by a person referred to as a deployer, who decides which fidgets and non-fidget information to include in the page, and the arrangement of the fidget(s) and non-fidget information on the page. The deployer and the extender may be the same individual or different individuals. It is noted that the deployer could also be a computer, in a system where a web page or the like employing fidgets is designed by an intelligent computer system.

Prior art event models are very rigid. For example, in Sun Microsystems' JavaBeans™ event model, the source, target, and event action are expressed as JAVA code. The author of the target code decides which events to handle and how to handle them, and once the target is built, its event actions cannot be changed without rebuilding the code. As a result, the target can handle only a fixed set of events. The JavaBeans™ event model is described in Sun Microsystems' JavaBeans™ Specification Version 1.01 (available for downloading or viewing at www.java.sun.com).

Microsoft's ActiveX specification, as well as various graphical user interfaces (e.g., Microsoft Windows, Xwindows, JAVA AWT) also define event models. However, these event models are similar to the JavaBeans™ model in their reliance on programming and their fixed nature. Netscape's JavaScript™ and Microsoft's VBScript define event models using complex scripting languages and require considerable technical knowledge to code event actions.

All these prior art event models are procedural event models.

It would be advantageous to provide an event model that requires minimal technical expertise to implement. It would be further advantageous to provide an event model where the event actions are expressed using fixed-format text strings in a declarative fashion. It would be further advantageous to allow for the source and target to be flexibly defined as any of hypertext markup language, JavaScript™, JAVA code, an arbitrary URL link, or the like. It would be even further advantageous to enable a deployer to specify the event target and to decide which events to handle and how to handle them. It would be still further advantageous to set the target properties and/or event action at deployment time.

The methods and apparatus of the present invention provide the aforesaid and other advantages.

SUMMARY OF THE INVENTION

The present invention relates to an improved event model using software components (designated "Fidgets" herein) which use fixed-format text strings to express event actions in a content delivery subsystem. In particular, the present invention provides a method for setting the event target property for a user event without the need to recompile software.

A fidget is created by a fidget author (the extender). The extender defines a set of user events which the fidget may generate at run-time. Each user event may have a set of named event parameters. The extender will also provide a fidget property for each user event, designated the event target. When creating a page, the deployer can use the event target to specify the action to be taken if and when the event occurs. The value of the event target property is a string which specifies a target frame and either an arbitrary URL or a page and zero or more target fidgets with a property to be called for each, as well as the order in which this is done. The event target string may be a fixed-format text string.

The deployer may include the names of event parameters in the target string (e.g., as property values or method arguments). When the event is fired at run-time, the names of the event parameters will be replaced by their actual values, which values may depend upon the state of the source fidget or on the user's actions. The fidget author may provide a graphical user interface (editor) to simplify the process of specifying an event target string.

Events can be fired directly to the specified targets, if the source and target fidgets are on the same page and produce active renderings. Alternatively, the events can be fired to a server-side component (e.g., a JAVA Server Page (JSP)) which performs the specified action (for example, when the source or target is an HTML fidget).

A fidget can provide self-contained functionality. Alternatively, a fidget can be connected to other fidgets, either on the same page or on different pages. For example, a fidget which displays a list of items can be connected to a fidget which displays a single item in detail, to enable a user to select an item from the displayed list to be examined.

In an exemplary embodiment of the invention, a method of creating an event model in computer software for handling computer related user events is provided. A software component user interface (i.e. a fidget) is provided. A user event is defined which may be generated during the execution of the software component. The software component is provided with a set of event parameters relating to the user event. An event target property is set for the software component, which event target property is associated with the user event. For a given software component instance the event target property specifies an event action based on the set of event parameters. The event action is taken if and when the user event occurs. The event target property may be expressed using text strings.

In a preferred embodiment of the invention, the event target property can be set without recompiling the software. The text strings may comprise fixed format-text strings.

A graphical user interface may be provided for use (e.g., by the deployer) in specifying the event target property of the software component.

The user events may be implemented as JavaBean™ events. The software component may be associated with a page, an object type, an extension server, a method of an extension server, or the like.

The invention also includes computer readable media, having thereon computer program code means for creating an event model in computer software for handling computer related user events as described above.

In an alternate embodiment of the invention, a method of handling computer related user events using software components is provided. A user request for a first server page (SP) is received at a server, said SP containing a source software component which identifies an event target. The source software component is rendered at the server and outputted to a user's browser for display as part of a web page, the rendered source software component identifying a second SP having one or more target software components. The selection of a second SP is provided for, which selection is received at the server. Request parameters of the source software component are searched to locate event target parameters of the source software component at the second SP. The event target parameters of the source software component are executed at the second SP located during the searching step by setting an event property or invoking a method for each target software component of the second SP based on the event target parameters of the source software component. The one or more target software components are rendered at the server for output to a user's browser. In this embodiment, the event target property of the source software component corresponds to a user event, and the event target property is expressed using text strings.

In a preferred embodiment, the text strings comprise fixed-format text strings.

The source software component may be rendered as hypertext markup language (HTML) and the user event may comprise an HTML link.

Alternately, the source software component may be rendered as JavaScript code and the user event may comprise one of (i) an HTTP request for the second SP, or (ii) a JavaScript™ call to a target software component on the same page, which target software component is rendered as one of JavaScript™ code or a JAVA applet.

Further, the source software component may be rendered as a JAVA applet and the user event may comprise one of (i) an HTTP request for the second SP, or (ii) a JAVA call to a target software component on the same page, which target software component is rendered as one of JavaScript™ code or another JAVA applet.

In addition, the source software component may be rendered as XML (Extensible Markup Language) and the user event may comprise an XML Linking Language (Xlink) link to the second SP. XML is a specification developed by The World Wide Web Consortium (W3C).

The first SP and the second SP may comprise JAVA Server Pages, JAVA servlets, other Hypertext transfer Protocol (HTTP) server plugins, Common Gateway Interface (CGI) programs, or the like.

The user events may be implemented as JavaBean™ events.

The invention also includes a computer readable media, having thereon computer program code means for handling computer related user events using software components as described above.

DETAILED DESCRIPTION OF THE INVENTION

Figure 1:
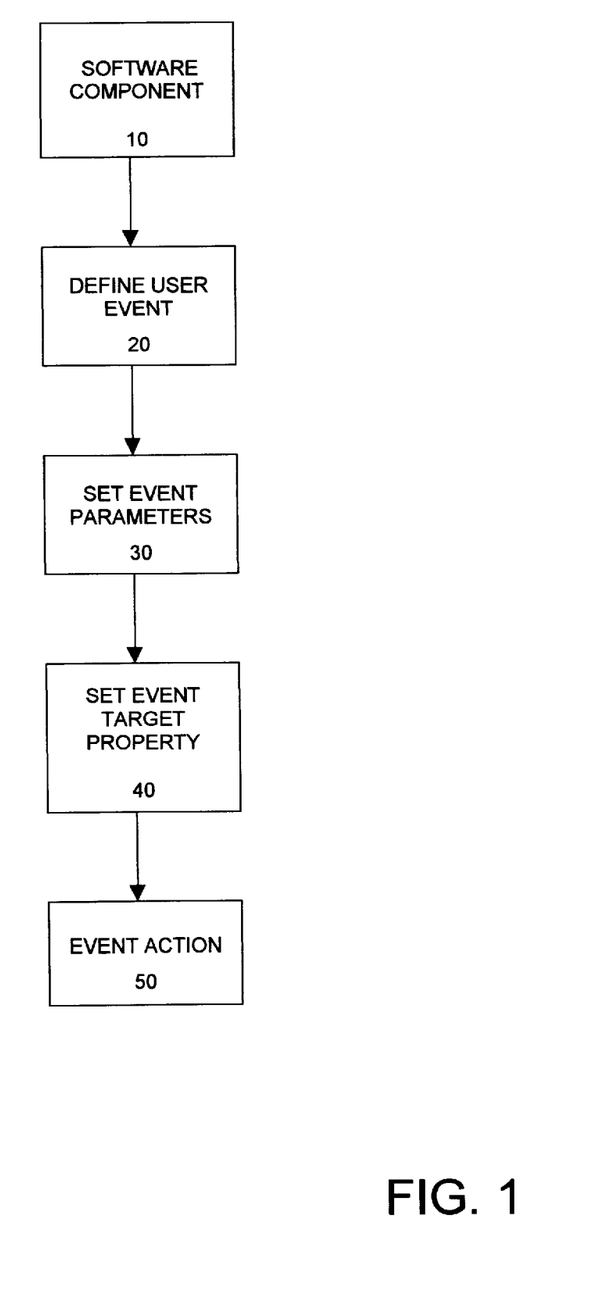
FIG. 1 is a flow chart of an embodiment of an event model in accordance with the invention.

In an exemplary embodiment of the invention, a method is provided for creating an event model in computer software to handle computer related user events. FIG. 1 is a flowchart showing the steps involved in creating an event model in accordance with the present invention. A software component user interface (i.e., a fidget) 10 is provided. A user event 20 is defined which may be generated during the execution of the software component 10. The software component 10 is provided with a set of event parameters 30 relating to the user event 20. An event target property 40 is set for the software component 10, which event target property 40 is associated with the user event 20. For a given software component instance, the event target property 40 specifies an event action 50 based on the set of event parameters 30. The event action 50 is taken if and when the user event 20 occurs. The event target property 40 is expressed using text strings.

In a preferred embodiment of the invention, the event target property 40 can be set without recompiling the software. The text strings used to express the event target property may comprise fixed format-text strings. Therefore, when a new software component 10 is added, a deployer can integrate it with existing software components by setting its event target properties 40 or those of the existing software components, without the need to add or recompile code.

A graphical user interface may be provided for use (e.g., by the deployer) in specifying the event target property 40 of the software component 10.

The user events 20 may be implemented as JAVA Bean events. The software component 10 may be associated with a page, an object type, an extension server, or a method of an extension server, or the like.

The invention also includes computer readable media, such as a floppy disk, CD-ROM, memory stick, or the like, having thereon computer program code means for creating an event model in computer software for handling computer related user events as described above.

A fidget has three aspects, corresponding to three different usage modes. At design time, when a deployer adds fidgets to a page and sets up their event targets, a fidget is represented by a fidget editor. At render time, when the server receives a request for a page containing a fidget, the fidget may be represented by the fidget component itself. At run time, when the rendering is displayed to the end user, the fidget is represented by a rendering, which may be static (e.g., HTML) or active (e.g., DHTML/JavaScript or an applet).

Figure 2:
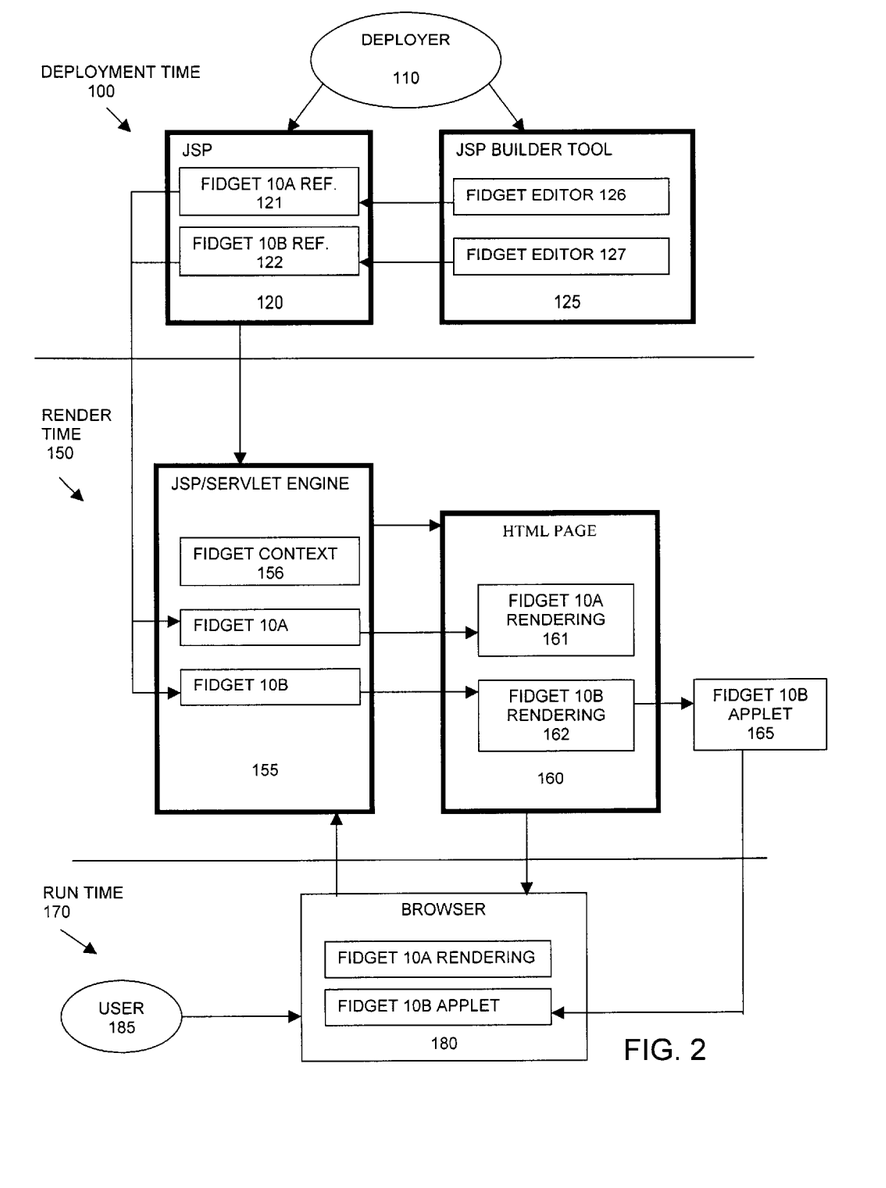
FIG. 2 shows a simplified embodiment of an event model in accordance with the invention.

FIG. 2 illustrates these relationships among various components of the content delivery subsystem and the process flow. It should be appreciated that the model shown in FIG. 2 is a simplified model provided as an example.

At deployment time 100, a deployer 110 creates a JAVA Server Page (JSP) 120 either directly or by using a JSP Builder Tool 125. The JSP Builder Tool may contain one or more Fidget Editors 126, 127. The JSP 120 contains references 121, 122 to fidgets 10A and 10B, respectively, and their properties. Fidget Editors 126, 127 can be used in the Builder Tool 125 to provide a graphical user interface (GUI) for deploying these fidgets 10A and 10B and setting their initial properties.

At render time 150, the JSP engine 155 (which is implemented on top of a servlet engine) receives a request for the JSP 120, loads the servlet generated from that page, and instantiates the fidget context 156 and fidgets 10A and 10B (which, e.g., may comprise JavaBeans) corresponding to the fidget references 121, 122 stored in the JSP page 120. The fidgets 10A and 10B render themselves to HTML, possibly communicating other server-side software components to do so. Such server-side software components may comprise, for example, databases, accounting systems, inventory systems, order entry systems, security systems, real-time data feeds, Enterprise Java Beans (EJBs), and the like. The JSP engine 155 combines the output of the fidgets 10A and 10B with static HTML code contained in the JSP page 120 to produce an HTML page 160 containing the fidget 10A rendering 161 and fidget 10B rendering 162, which is returned to the client.

At run time 170, the browser 180 receives the HTML page 160 from the server and displays it.

In the example shown, fidget 10B produces HTML code which loads a JAVA applet 165. The browser 180 downloads the applet 165 and runs it. The user 185 interacts with the HTML page 160 and applet 165 via the browser 180. Certain actions that the user 185 performs may generate a new request for a different JSP (or the same JSP in a different state).

Most fidgets are renderers, which means that they work with an underlying information object (or objects) and display it in some manner. Other fidgets may be front ends for services and are not associated with a particular information object. A fidget is responsible for rendering and user interaction for an abstract user interface (UI). Thus, to take an example, an extension server which supports browsing a hierarchy might have one fidget to represent a tree control interface, and another to represent a hierarchy browser. Each fidget may support several different renderings, one of which will be chosen at render time depending on the capabilities of the user agent and the preferences of the user.

All renderers are fidgets. Renderers also have properties and may have actions, and should also be accessible from scripts. Client-side renderers are fidgets as well. Client-side renderers perform the rendering on the client, but their properties may be accessible on both the server and the client. Possible rendering types include HTML, DHTML/JavaScript™ For Internet Explorer 4.0+, DHTML/JavaScript™ For Netscape Navigator 4.0+, Java applet ("active front-end"), and the like.

Fidgets should be securable objects. An administrator should be able to restrict access to particular fidgets and to grant privileges to fidgets like other securable objects using a security framework. If a page is requested by a user who is not allowed to access a fidget contained thereon, the page must be delivered but without the fidget's rendering. Likewise, an event triggered on behalf of a user to a fidget to which the user does not have access must not be delivered, though the page to which the event was triggered may still be rendered.

Figure 3:
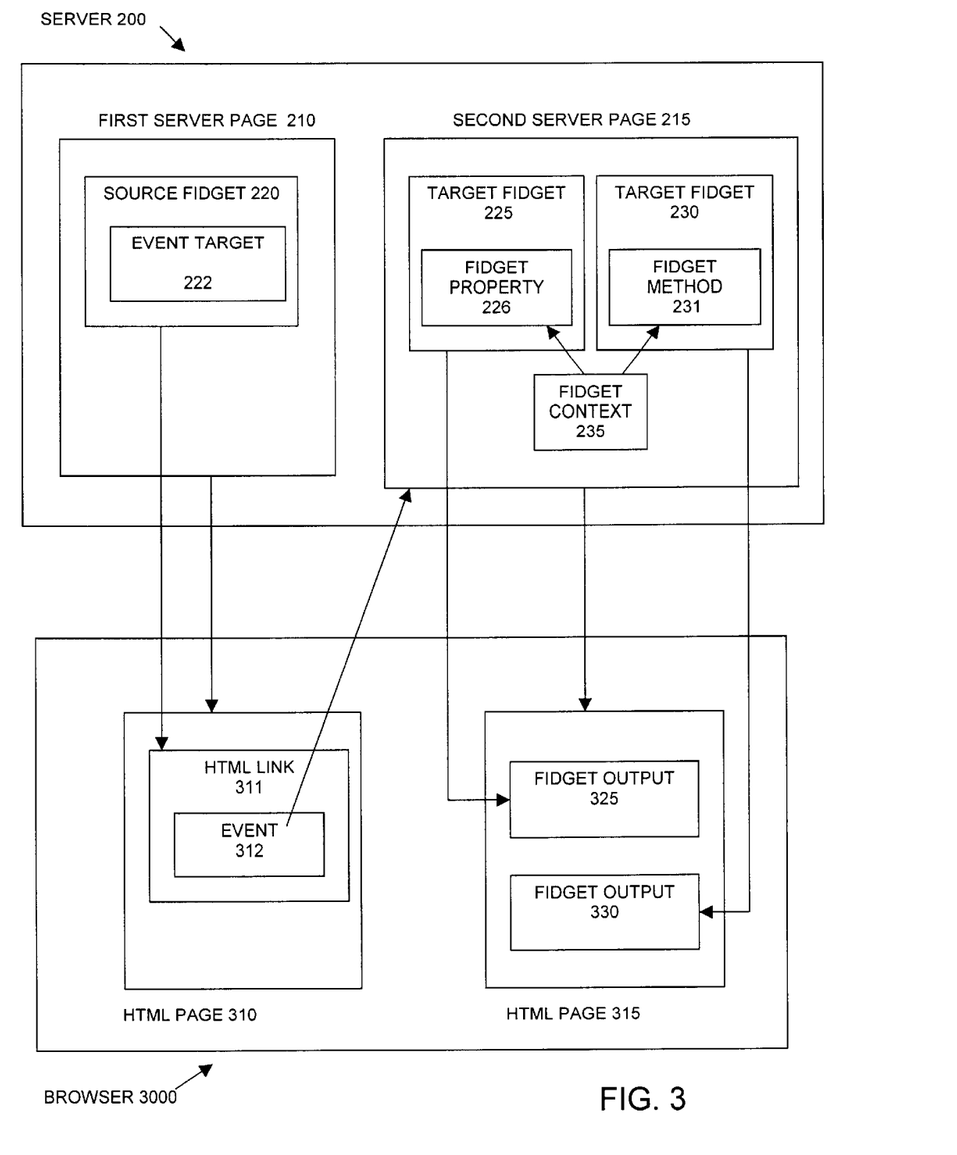
FIG. 3 illustrates a preferred embodiment of an event model in accordance with the present invention.

In an alternate embodiment of the invention as shown in FIG. 3, a method of handling computer related user events using software components is provided. A user request for a first server page (SP) 210 is received at a server 200. The SP 210 contains a source software component (Fidget) 220 which may include, for example, an event target 222 identifying a target page 215, property 226 of target fidget 225, and method 231 of target fidget 230. The source software component 220 is rendered at the server 200 and provided as output to a user's browser 300 for display as part of a web page 310, the rendered source software component (e.g., HTML link 311) identifying a second SP 215 having one or more target software components (e.g., Target Fidget 225 and Target Fidget 230). The selection of a second SP 215 is provided for (e.g., via HTML Link 311), which selection (i.e., event 312) generates an HTTP request to the server 200, including HTTP request parameters corresponding to the event target 222. The fidget context 235 searches the HTTP request parameters to identify the target software components (fidgets 225, 230) of the second SP 215 and the target property 226 or method 231 for each. The fidget context 235 then sets the target property 226 to a value specified in the corresponding HTTP request parameter generated from the event target 222, and invokes the target method 231 with method parameters likewise specified in the corresponding HTTP request parameter. The one or more target software components 225, 230 are rendered at the server 200 for output to a user's browser 300. In this embodiment, the event target property of the source software component 220 corresponds to a user event 312, and the event target property is expressed using text strings.

In a preferred embodiment, the text strings comprise fixed-format text strings.

As shown in FIG. 3, the source software component 220 may be rendered as a hypertext markup language (HTML) page 310 and the user event 312 may comprise an HTML link 311.

Alternately, the source software component 220 may be rendered as JavaScript code and the user event 312 may comprise one of (i) an HTTP request for the second SP 215, or (ii) a JavaScript™ call to a target software component on the same page 310, which target software component is rendered as one of JavaScript™ code or a JAVA applet.

Further, the source software component 220 may be rendered as a JAVA applet and the user event 312 may comprise one of (i) an HTTP request for the second SP 215, or (ii) a JAVA call to a target software component on the same page 310, which target software component is rendered as one of JavaScript™ code or another JAVA applet.

In addition, the source software component 220 may be rendered as XML and the user event 312 may comprise an XML Linking Language (Xlink) link to the second SP 215.

The first SP 210 and the second SP 215 may comprise JAVA Server Pages, JAVA servlets, other Hypertext transfer Protocol (HTTP) server plugins, Common Gateway Interface (CGI) programs, or the like.

The user events 312 may be implemented as JAVA Bean events.

The invention also includes a computer readable medium, having thereon computer program code means for handling computer related user events using software components as described above.

The following includes a detailed description of the architecture and software code which may be used in a preferred embodiment to implement the present invention:

1. Fidget Interface

In addition to exposing properties, methods, and events using the design patterns described in the JavaBeans specification, all fidgets in this embodiment implement the following interface:

```
interface Fidget
{
public static final int FMT_HTML=1;
public static final int FMT_XML=2;
public String getFidgetID ( );
public void setFidgetID (String strID);
public FidgetContext getFidgetContext( );
public void setFidgetContext (FidgetContext fc);
public boolean isCachable( );
public boolean isRenderingValid (int iRenderID);
public int render (int iFormat, java.io.Writer out)
throws FormatNotSupportedException;
public void render (PageContext pc);
public void render (ServletRequest req, ServletResponse
resp);
}
```

The Fidget members are as follows:

| | |
|---|---|
| FMT_HTML, FMT_XML | Formats which can be rendered to. |
| getFidgetID ( ) | Returns the fidget ID. This is an identifier which is unique to the current page, by which the fidget can be referenced in script. This ID, combined with the page ID, yields an identifier which can be used to specify the target of an event. |
| setFidgetID ( ) | Sets the fidget ID. This must be called by the deployer when the fidget is added to a page (or servlet). |
| getFidgetContext ( ) | Returns the fidget context object. This is a hidden property. |
| setFidgetContext ( ) | Called by the fidget context object to give the fidget a reference to itself. |
| isCachable ( ) | Called by the fidget context object to determine whether it should attempt to cache the fidget's rendering. This is a hidden property. |
| isRenderingValid ( ) | Called by the fidget context object to determine whether a cached rendering of the fidget can be used. This is a hidden property. |
| render (int) | Renders the fidget's user interface in the specified format (usually HTML) to the supplied Writer. This may or may not yield the same result as serializing the fidget. If the fidget is unable to render itself in the specified format, it should throw a FormatNotSupportedException. Note that if the fidget is a Java applet or other active front-end, it may still be required to render itself to HTML - in this case, it should return the appropriate <OBJECT> or <EMBED> tag and parameters. To reuse the rendered output, pass it a StringWriter. Returns an ID which may be used in subsequent calls to isRenderingValid( ), or −1 if its rendering should not be cached. |
| render (Page-Context) | Renders the fidget to the specified JSP page context object using its default rendering format. This method is provided for the benefit of "static renderer" fidgets which return an object other than HTML by setting the Content-type response header. Once this method has been called successfully, it is illegal for the calling Thread to attempt to modify the ServletResponse object. Any such attempt to do so shall result in undefined behavior. |
| render (Servlet-Request, ServletResponse) | Renders the fidget to the specified response object using its default rendering format. This method is provided for the benefit of "static renderer" fidgets which return an object other than HTML by setting the Content-type response header. Once this method has been called successfully, it is illegal for the calling Thread to attempt to modify the ServletResponse object. Any such attempt to do so shall result in undefined behavior. |

A FidgetAdapter class is provided which includes default implementations of these methods and also implements Serializable. A fidget can extend or delegate to this class and override the methods for which it wants to provide a custom implementation. Usually the render ( ) method is the only one that will need customization.

In addition to implementing the above interface, all fidget in this embodiment obey the following rules:

1. Fidget properties should only have primitive types or String type, except for event targets, which should have EventTarget type. Likewise, public fidget methods which are exposed as JAVABean™ methods should either have no parameters, or only parameters with primitive types or String type. This is because events which target this property or method will pass their arguments as strings, which must be converted to one of a known set of types. Unfortunately, while JAVA defines a toString ( ) method for every object, it does not define the reverse.

2. Fidget properties and public methods should not have multiple overloaded versions with the same number of parameters. In ordinary JAVA method dispatching, two methods with the same name and number of parameters can be distinguished based on their parameter types; but since the arguments to fidget methods are passed as strings, there is no parameter type information.

3. Any methods which access or update the fidget's state should be synchronized, since a single instantiated fidget object may potentially be accessed from multiple threads simultaneously (if it is stored at session scope).

4. Fidgets should not use the hidden-state attribute (described in section 5.4.1 of the JavaBeans 1.01 specification. A fidget's state must be completely described by its properties and methods, since otherwise it cannot be transparently expressed in a JSP).

5. The fidget must implement the Serializable (or Externalizable) interface. This allows fidgets to participate in distributable applications, introduced in the JAVA Servlet Specification Version 2.2, which can be dynamically load-balanced across multiple JVMs or servers (available for viewing or downloading from www.java.sun.com). Since JavaBeans™ must implement Serializable anyway, this imposes no additional burden on the fidget developer.

In some cases it is convenient for a fidget to expose indexed properties with non-integer indexes or more than one index, neither of which is provided for by the JavaBeans™ specification. For example, suppose a data entry fidget is provided consisting of an HTML table with a text input field in each cell, it would be advantageous to expose the cells as a property indexed by row and column. Of course, this can be accomplished with getcell (row, col) and setCell (row, col, value) methods. To expose the cells as properties so that each text input field can be used to specify an event target by can be accomplished by naming it Cell[3,4], for example. Since this is likely to confuse a bean tool which expects a single index, a fidget which wishes to do this should provide a BeanInfo object identifying these as methods and not properties. Alternatively, a custom editor can be provided.

2. Fidget IDs and Page IDs

A fidget ID is assigned by a deployer when the fidget is added to a JSP. It is a human-readable string. No two fidgets on the same page may have the same ID. However, two fidgets on different pages may have the same ID. If this is the case, and the deployer declares the fidgets at page or request scope, then these will be two distinct fidget instances. However, if the deployer declares them at session or application scope, then there will be only one fidget instance which will be shared between the pages (unless they have different types, in which case an exception will be generated). Any page-specific properties can be set explicitly on each page, outside the JSP useBean tag. If the deployer wants two fidget instances of the same type on different pages at session scope, different Ids should be given to each fidget.

A page ID is also assigned by a deployer. It is usually the relative URL to the page (including the initial '/'). If the deployer is not using JSP, however, the page ID should be the relative URL to the request processor (servlet, CGI script, or whatever) plus a unique query string. In this case, the page is a logical construct and has no physical existence except as the response returned to the client. The page serves merely to group fidgets together. The reason for the requirement that page IDs be relative URLs is to simplify event firing. This does carry a maintenance burden for the deployer. If the deployer moves or renames a page, any events on other pages which target that page must be manually updated. This burden can be reduced by keeping an internal mapping of page IDs (which could then be any unique string) to URLs, but doing so would have its own costs: a servlet must be provided to route events to the correct physical page at run time, or to look up the mapping at render time, either of which would degrade performance slightly. An administrative tool can be provided which a deployer can use to set up the ID mapping every time a page was added, moved, or renamed.

3. XML/XSL fidgets

A fidget implementer may use any means to produce the requested rendering. However, to provide maximum customizability, fidgets in this embodiment are designed to produce an XML document and apply an XSL stylesheet to it to render to the requested format. A customizer can then modify the stylesheet or even specify one of several stylesheets, if the name of the stylesheet is exposed as a fidget property.

This is not the only possible design which would allow fidgets to be customized. A fidget could use a template mechanism such as webmacro (www.webmacro.org), FreeMarker (freemarker.org), or MindTemplate (www.mindbright.se/english/technology/products/mindtemplate ). Alternatively, a fidget could include the output of another JSP page. However, the XML/XSL approach has the advantage that it is more general than most of these (it is not specifically tied to HTML), more flexible (the XML output could be sent to another program or even rendered directly in an XML-aware browser), and a W3C standard. Its major disadvantage is the XSL declarative template-matching approach, which is less easily understood than a simple template with variable replacement.

To support this model, an XMLFidgetAdapter class is provided which includes a stylesheet property and whose render ( ) method applies this stylesheet to an XML document which the fidget implementer should set by calling setXML ( ).

4. Execution Environment

This embodiment uses the Java Server Page (JSP) technology for its execution environment, because the JSP engine (or the JAVA servlet engine, on which it is based) provides session tracking and management and supports instantiating JavaBeans™. It supports caching beans in memory for the duration of a session. It allows pages to be completely customized using HTML and JAVA and supports including one page in another. The JSP engine allows pages to use stylesheets. It also allows pages to be expressed in any text-based format, HTML, XML, SGML , JavaScript, and the like.

The present invention makes use of JSP as its preferred front-end deployment mechanism. However, it is recognized that some deployers may prefer to use another mechanism, so all the components described herein are also designed to be usable from a servlet or any other middle-tier program capable of hosting JAVA components. Using one of these mechanisms will most likely require more work from the deployer than will using JSP.

Each JSP containing fidgets is required to have a unique string ID, which for simplicity should be the relative URL to the page.

5. Instantiating Fidgets and Fidget Context

JSP allows JavaBeans to be instantiated via the <jsp:useBean>tag. The scope attribute lets the deployer specify the lifetime of the bean (i.e. page, request, session, or application). The contents of the tag let the deployer specify initial property values for the bean or perform other one-time initialization. Note that (as mentioned above) a fidget instance can be shared among multiple pages if it is declared at session or application scope and given the same ID in each page.

Once a bean has been instantiated, the deployer must add Java code to embed its properties or method return values in the output HTML. The deployer may call fidget methods or properties directly, but in order to take advantage of page caching and personalization, and to provide a convenient mechanism for one fidget to communicate with another one on the same page, some central component is needed. This central component is the fidget context.

The fidget context object would ideally be available as an implicit object in every JSP. The JSP 1.0 (and 1.1) specification provides a way to define implicit variables, by using the extends attribute of the page directive to specify a custom superclass for the JSP. The service method of this class can perform pre- and post-processing in addition to calling the _jspservice method to execute the actual JSP. As part of the preprocessing, it can define its own implicit variables. Note that the fidget context object is not used at design time, since a builder tool cannot be told to instantiate it, even if the deployer is using a tool. This means that fidgets must not rely on any fidget context functionality at design time. In general, fidgets should not rely even on being instantiated at design time. The Fidget Context class is as follows:

```
public class FidgetContext
{
public static final int STYLE_CSS_EMBEDDED=1;
public static final int STYLE_CSS_LINKED=2;
public FidgetContext( );
public void doEvent (Map requestParams);
public String getCachedPage( );
public void commitCache (String strPage);
public void addFidget (Fidget f);
public String getPageID( );
public void setPageID (String strID);
public int getRenderFormato ( );
public void setRenderFormat (int iFormat);
public boolean isPageCachable( );
public void setPageCachable (boolean bCachable);
public int getStyleFormat( );
public void setStyleFormat (int iFormat);
public String getStyle( );
public Iterator getFidgets( );
public Fidget getFidget (String strFidgetID);
public void renderFidget (String strFidgetID,
java.io.Writer out)
throws FormatNotSupportedException;
public String renderEventURL (UserEvent e, EventTarget t);
public String renderEventJS (UserEvent e, EventTarget t);
}
```

The FidgetContext members are as follows:

| | |
|---|---|
| STYLE_CSS_EMBEDDED, STYLE_CSS_LINKED | Values for getStyleFormat( ) and setStyleFormat ( ). |
| FidgetContext ( ) | Constructs a new fidget context object. |
| doEvent ( ) | Looks through the specified Map for event target parameters; if it finds any, sets the appropriate properties and calls the appropriate methods on the appropriate target fidgets. |
| getCachedPage ( ) | Checks whether a valid cached rendering of the current page is available; if so, returns it; if not, returns null. |
| commitCache ( ) | Saves a rendered page to the repository. |
| addFidget ( ) | Tells the fidget context about a fidget on the same page. This is not required for deployers who are using JSP. |
| getPageID ( ) | Returns the ID of the current page (usually something.jsp). |
| setPageID ( ) | Tells the fidget context what the ID of the current page is. This is not required for deployers who are using JSP. |
| getRenderFormat ( ) | Returns the current format in which fidgets will be rendered (default is FMT_HTML). |
| setRenderFormat ( ) | Tells the fidget context what format to use to render fidgets. |
| isPageCachable ( ) | Returns true if the fidget context should try to cache the current page, false otherwise. |
| setPageCachable ( ) | Tells the fidget context whether or not to attempt to cache the current page. |
| getStyleFormat ( ) | Returns the current stylesheet format. |
| setStyleFormat ( ) | Tells the fidget context what stylesheet format to use. |
| getStyle ( ) | Returns a string representing the stylesheet(s) appropriate for the current theme and stylesheet format. This will be an HTML <STYLE> tag. |
| getFidgets ( ) | Returns an iterator which can be used to enumerate the fidgets on the current page. |
| getFidget ( ) | Returns a reference to the named fidget. |
| renderFidget ( ) | Renders the fidget to the specified Writer, using the current output format. This may ask the fidget to render itself, or it may use a cached rendering if one is available. |
| renderEventURL ( ) | Returns a string containing a properly formatted URL to fire a user event, with event parameter values substituted. This URL will not be encoded to support URL-based session tracking (use ServletFidgetContext instead). |
| renderEventJS ( ) | Returns a string containing properly formatted Javascript code to fire a user event, with event parameter values substituted. |

The fidget context is intended to handle a single page request at a time. It must not be shared between multiple page requests, or unpredictable behavior may occur. The above fidget context class is general-purpose and can be used from any server-side environment. Subclasses are also provided for use in particular deployment environments. If a deployer is writing a servlet and wishes to host fidgets, the ServletFidgetContext class can be used, which provides some convenience methods:

```
public class ServletFidgetContext extends FidgetContext
{
public ServletFidgetContext ( );
public ServletFidgetContext (ServletRequest req,
ServletResponse resp);
public void setRequest (ServletRequest req);
public void setResponse (ServletResponse resp);
public void setLocale( );
public void doEvent( );
public boolean isPageCachedo( );
public void commitCache( );
public String getprincipal( );
public Locale getLocale( );
public String getUserAgent( );
public String encodeURL (String strURL);
public void renderFidget (String strFidgetID) throws
FormatNotSupportedException;
public String renderEventURL (UserEvent e, EventTarget t);
}
```

| | |
|---|---|
| ServletFidgetContext ( ) | Constructs a new fidget context object. |
| setRequest ( ) | Gives the fidget context a reference to the servlet request object. |
| setResponse ( ) | Gives the fidget context a reference to the servlet response object. |
| setLocale ( ) | Calls setLocale( ) on the servlet response object using the appropriate locale for the user so that the response writer will be configured appropriately for the locale (see section 6.4 of the Java Servlet Specification version 2.2). |
| doEvent ( ) | Same as doEvent(Map), but gets the request parameters from the servlet request object so the deployer need not put them into a map. |

-continued

| | |
|---|---|
| isPageCached ( ) | Checks whether a valid cached rendering of the current page is available; if so, sends it to the servlet response object and returns true; if not, returns false. If this returns true, no further output should be sent to the response object -- the servlet should return immediately. |
| commitCache ( ) | Flushes the page rendering cache output buffer to the client and saves it to the repository. |
| getPrincipal ( ) | Returns the name of the principal (usually a user) which requested this page. |
| getLocale ( ) | Returns a java.util.Locale object identifying the locale of the principal which requested this page. |
| getUserAgent ( ) | Returns a string identifying the user agent (usually a browser) which requested this page. |
| encodeURL ( ) | Calls the encodeURL ( ) method of the servlet response object. A fidget must call this method for any URL which it outputs which should participate in the current session (except for URLs produced by renderEventURL ( ), which calls this automatically). |
| renderFidget( ) | Renders the fidget to the servlet response object. |
| renderEventURL ( ) | Returns a string containing a properly formatted URL to fire a user event, with event parameter values substituted. This URL will be encoded to support URL-based session tracking. |

If a deployer is using JSP, the custom JSP superclass mentioned above can automatically create a JspFidgetContext object. In order to access it, the deployer must add a JSP scriptlet <% JspFidgetContext fc=getFidgetContext ( ); %>. According to section 4.1 of the JSP 1.1 specification, declarations appear outside of the _jspService method and hence are instance members of the generated class, rather than local variables of the method.
The JspFidgetContext class is as follows:
public class JspFidgetContext extends ServletFidgetContext
{
public JspFidgetContext ( );
public JspFidgetContext (ServletRequest req, ServletResponse resp);
public void init (PageContext pc) throws ServletException;
public void setPageContext (PageContext pc);
public void renderFidget (String strFidgetID);
}

| | |
|---|---|
| JspFidget Context ( ) | Constructs a new fidget context object. |
| init (Page-Context) | Tells the fidget context we have all our fidgets and the page rendering is about to start. This is equivalent to making the following sequence of calls: fc.setPageContext (pc); fc.setLocale ( ); fc.doEvent ( ); if (fc.isPageCached ( )) return; If the page is cached, this throws a ServletException which will be caught by the FidgetJspSuper class -- this is to make sure no more output is sent accidentally. |
| SetPage Context( ) | Gives the fidget context a reference to the JSP page context object, from which it can get access to the fidgets on the page. This is called by init ( ). |

-continued

| | |
|---|---|
| CommitCache ( ) | Flushes the page rendering cache output buffer to the client and saves it to the repository. This is called automatically by the framework. |
| RenderFidget ( ) | Renders the fidget to the JSP's output stream. Unlike the ServletFidgetContext, this does not throw a FormatNot-SupportedException. |

Since fidgets are instantiated at render time by the JSP engine, there is no direct control over their instantiation, and the fidget context is not told what fidgets have been instantiated. Instead, the deployer is required to call the init ( ) method of the fidget context after all fidgets have been instantiated. This method does several things:

(setPageContext) Stores a reference to the JSP page context object, which is part of the generated servlet and hence not available to the FidgetJspSuper class.

Uses the page context's getAttributeNamesInScope( ) method to look for the fidgets which have been instantiated on the current page. For each fidget, calls the fidget's setFidgetContext ( ) method.

(doEvent) Scans the request parameters looking for ones which set properties or invoke actions on fidgets (i.e. event targets). These parameters will have the form (order)TargetFidget:TargetProperty=TargetValue or (order)TargetFidget:TargetProperty[index1,index2, . . . ]=TargetValue or (order)TargetFidget:TargetAction (ActionParam1,ActionParam2, . . . ). For any such parameters, sets the appropriate properties or calls the appropriate method on the target fidget. Event targets will be processed in the order specified, if any.

(isPageCached) Checks whether a cached rendering of the current page is available and asks each fidget whether its part of the cached rendering is still valid; if so, sends it to the JSP/servlet response object and returns true; if not, returns false.

6. Rendering Fidgets

A fidget can be rendered by calling the fidget context's renderFidget ( ) method, or by calling the fidget's render ( ) method directly, passing the JSP out stream, although this prevents the fidget context from attempting to cache the fidget's rendering. In the former case, the fidget will be rendered using the fidget context's renderFormat property. This is set to HTML by default, but it can be set to a different format such as XML (provided the fidget supports it).

This allows a model where, instead of fidgets rendering HTML to HTML pages with associated stylesheets, the deployer creates XML pages (perhaps also with stylesheets) and the fidgets render XML.

7. Auxiliary Files

In some cases, a fidget's rendering may need to refer to other generated files. For instance, an HTML charting fidget would need to generate a .gif or .jpeg file containing the chart image; its render ( ) method would produce an HTML <IMAGE> tag whose source attribute refers to the generated image file. JavaScript fidgets may wish to store some or all of their script in separate files. Applets and ActiveX objects refer to the Java class files and ActiveX code, respectively. Some of these files may be temporary (e.g., a chart image file) and should be deleted after they have been requested.

These auxiliary files could be stored in a public virtual directory on the Web server, but that would raise security concerns, since a user without access to an applet or a temporary file could potentially download it anyway if she knew the name of the file, or if the virtual directory allowed listing of its contents. In order for auxiliary files to participate securely, they will need to be stored in a repository, perhaps indirectly (that is, the file itself remains in a secure file system, but a reference to the file is stored in the repository).

A server component may be provided to mediate access to auxiliary files. This can be a simple servlet which checks the principal's access to the requested file and, if allowed, retrieves the file (or the file's location) from the repository and returns it to the client. If the file is marked as temporary, the servlet should delete the file after it has been retrieved. In order to clean up temporary files which are never requested, a daemon process is needed which periodically purges temporary files older than a certain age.

The fidget is then responsible for storing the auxiliary file in the repository, marking it temporary (if appropriate), storing its MIME type, and including in its rendering an appropriate URL to retrieve the auxiliary file and delete it afterwards, if necessary.

8. Event Handling

The event handling mechanism described herein is concerned only with front-end events, or user events. The event mechanism of the present invention provides for the following:

[Development time] The fidget author can define new events without worrying about how they will be handled. The author can expose actions which are potentially the targets of events without worrying about how the actions will be invoked.

[Design time] A builder tool can discover the events fired by a fidget, perhaps by introspection, so that a deployer can connect them to actions on other fidgets. The deployer should be able to use the event type, along with the page ID, fidget ID, and event properties, to uniquely identify a target page, fidget, and action. The deployer should be able to associate event properties with parameters of the action.

[Rendering time] The fidget context can generate code to fire an event, ideally without having to perform introspection to determine how to encode the event.

[Run time] Events can be dispatched with minimal overhead and without knowing anything about the event, the source fidget, or the target fidget.

9. User Events

A user event is the result of an action that the user may take on a front-end software component (fidget) which can affect another front-end component. Each component may have a different set of user events.

User events are distinct from low-level events. For pure HTML fidgets, the only low-level events are those which trigger server requests (e.g., clicking on a hyperlink or image map or submitting a form). However, an HTML fidget may define an arbitrary number of user events. For instance, an HTML hierarchy browser might define "showChildren" and "selectNode" user events (among others). A user event includes the following information:

The type of the event (for instance, "selectNode")

The ID of the fidget that fired the event

The ID of the page on which the fidget that fired the event lives

Event-specific properties. For example, a tree fidget might fire a user event when a node is selected; it would want to include information to identify the selected node and possibly the previously selected node. These properties should be serializable as Strings.

User events are implemented as JAVABean events to support introspection by design tools. The invention defines an event source class for user events as a JAVABean™ so that its custom properties can be identified by standard bean introspection. The base class is as follows:

public class UserEvent extends java.util.EventObject
{
public UserEvent (Fidget source);
public String getSourcePage( );
public String getSourceFidget( );
public void substParams (StringBuffer sb);
public static void substParam (StringBuffer sb, String strParamName, String strParamValue);
}

Individual fidgets may extend this class to define their own events with custom properties. Custom properties should have values which either are strings or have useful string encodings, since they may need to be encoded in URLs. Also recommended is following the JavaBean™ usage and making the user event class immutable, defining its property values in the constructor.

10. Event Targets

All but the simplest fidgets generate user events at run time. When a fidget is deployed to a page, these user events must be connected to appropriate targets. A target is either an arbitrary URL, or else an action on a fidget on a page; it may be the same fidget that fired the event, or it may be another fidget on the same or another page. The action may be a public method of the fidget whose parameters (if any) are primitive types, or a property to be set. Actions may-have parameters which receive their values either statically (specified at deployment time) or dynamically (from event properties).

A single user event may only target one page, though it could target several fidgets on that page or several properties of a fidget. A single user event could also target one of several different pages depending on the value of one or more event parameters.

A user event may be connected to a target either explicitly, by the deployer, or implicitly, by the fidget itself, when it is first instantiated on a page. In the former case, if the deployer is using a builder tool, the fidget editor can provide a means of browsing for target pages and fidgets.

An explicit connection between a user event and a target can be stored in the JSP itself, as a property of the source fidget. This provides maximal transparency, reduces render-time overhead (since the target need not be looked up from the repository or some other source), and supports hand coding or editing. In order to support this, for each event, a fidget must define an eventTarget property, whose value is a string of the following form:

{TargetFrame}#TargetURL
or
{TargetFrame} TargetPage
?(order) TargetFidget:TargetProperty=TargetValue
&(order)TargetFidget:TargetProperty[PropIndex1, PropIndex2, . . . ]=TargetValue &(order)TargetFidget:TargetAction(ActionParam1, ActionParam2, ...)
&...

| | |
|---|---|
| TargetFrame | Frame or window in which the target page should be displayed. If omitted, uses the current frame. Other values are the same as for the target attribute of the HTML <A> tag: _self, _parent, _top, _blank, or a named frame/window. |
| TargetURL | An arbitrary URL, possibly including a query string. |
| TargetPage | ID of the target page. This can be omitted if the target page is the same as the source page, but the question mark must still be included. |
| order | Order in which this event target should be processed (optional). This is an ordinal number (1 or greater). All targets with an explicit order will be processed before any targets without an order. The order in which targets without orders will be processed is undefined. |
| TargetFidget | ID of the target fidget. This can be omitted if the target fidget is the same as the source fidget, but the colon must still be included. |
| TargetProperty | Name of the target property to set. |
| PropIndex | Value of an index of the target property, as a string. Since the JavaBeans specification does not provide for properties with non-int indexes or more than one index, the fidget must expose such properties as methods. |
| TargetValue | Value of the target property to set, as a string. |
| TargetAction | Name of the target action to execute. |
| ActionParam | Value of a parameter of the target action, as a string. |

Throughout this string, the deployer can specify that the value of an event property should be inserted at runtime by including the name of the event property enclosed in @...@. This allows event property values to be used as parameters to URLs, and it means that an event can target different pages or fidgets depending on the value of an event property. Since all user events are subclasses of UserEvent, the @sourcePage@ and @sourceFidget@ parameters are always valid.

The fidget is responsible at render time for translating event properties into the appropriate syntax for firing an event. At render time, the fidget may check whether some or all of its event targets are valid, either just for those targets on the same page or for all targets.

As an example of event targets, assume there exists a hierarchy viewer fidget whose ID is "treeView" which fires an event "selectNode" with one parameter, the name of the node, whenever the user selects a node of the hierarchy. Suppose a deployer wants to connect this event to another fidget on the same page, a document viewer whose ID is "docView", and set its "document" property to be the name of the node selected. The following code is an example that illustrates the above:

```
<jsp:useBean id="docView" beanName=
   "DocumentViewerBean"
scope="session" />
<jsp:useBean id="treeView" beanName="TreeViewBean"
scope="session">
<jsp:setProperty name="treeView"
property="selectNodeTarget"
value="?docView:document=@selectednode@"/>
</jsp:useBean>
```

In order to allow fidget editors to provide custom property editors for event targets of events with custom properties, the eventTarget property should have type EventTarget, derived from EventTarget. This also makes it easier for a fidget to target events to itself or other fidgets on the same page automatically at render time. The base class is as follows:

```
public class EventTarget
{
public class TargetFidget
{
public String strTargetFidgetID;
public String strTargetProperty;
public String strTargetValue;
public String strTargetAction;
public String[] astrTargetParams;
} public String strEventName;
public String strTargetFrame;
public String strTargetURL;
public String strTargetPageID;
public TargetFidget[ ] aTargetFidgets;
public String getAsText ( );
public void setAsText (String strText) throws
IllegalArgumentException;
}
```

The class members are similar to the components of the string described above. All but the strEventName and strTargetURL or strTargetPageID members can be null. The getAsText ( ) and setAsText ( ) members are conveniences for event target property editors. The astrTargetParams member can be used either for action parameter values or property index values.

The FidgetAdapter class defines various methods which reduce the burden on fidget authors of supporting events in this fashion. The fidget author must still define the event target properties described here, but the rendering of these can be delegated to the FidgetAdapter class.

A fidget can specify that certain events which it fires should be targeted to itself, unless overridden by the deployer. For instance, a tree fidget may by default direct its "expandNode" event to itself. (Ideally this would not be necessary—the fidget would just handle these cases internally. But HTML fidgets must fire an event whenever they need to change their rendering; JavaScript fidgets may not want to download all the data they might need and so would fire an event when they need more data.)

A fidget can target events to itself either by initializing itself with default values for its eventTarget properties, or by simply rendering such events as targeting itself in its render ( ) method. A set of fidgets may be designed to work together, firing user events to each other by default, in the same manner. At render time, each fidget would have to ask the fidget context to enumerate the other fidgets on the page using, e.g., the getFidgets ( ) method. For each other fidget, the fidget would check whether it belongs to a class which it knows about, and perhaps whether it is associated with the same information object.

11. Firing Events

Depending on the fidget's implementation and the event target's location and implementation, the fidget may or may not actually fire a JAVABean event when a user event occurs. There are three possibilities:

a. Pure HTML

If the event target is on a different page, or the event is fired to or from a pure HTML fidget, the fidget firing the event should generate an HTTP request using the following URL syntax:

http://server/TargetPage
?(order)TargetFidget:TargetProperty=TargetValue
&(order)TargetFidget:TargetProperty[PropIndex1,
    PropIndex2, . . . ]=TargetValue
&(order)TargetFidget:TargetAction(ActionParam1,
    ActionParam2, . . . )
& , . . .
This syntax, after the server identification, is identical to the string syntax for event targets described in the previous section, except without the target frame (which the fidget should encode in the HTML link or form tag). It allows an event to be fired to multiple targets on the same page. For example, http://farcaster/explorer.jsp?docView:document=foo.doc&stat usBar:show(foo.doc) The target page is responsible for processing request parameters which are event targets. For JSP pages which use a JspFidgetContext, this will be done automatically by the init method. Servlets can use the doEvent method of the ServletFidgetContext class to perform this. Other applications should put the request parameters in a map and call the doEvent method of the base FidgetContext class. As a convenience, the fidget context object defines a renderEventURL method which the fidget can call to create a properly formatted URL for a user event.

b. JavaScript

If the event target is on the same page and is a JavaScript fidget, it must expose its properties and methods as JavaScript™ properties and methods of a fidget object named with the fidget ID. Methods should be declared to take a single argument which is actually an associative array indexed by the real parameter names. For example:
function scrollDocViewer (args)
{
. . . args["nRows"]. . .
}
function DocViewerFidget( )
{
this.document=null
this.scroll=scrollDocViewer
}
docView=new DocViewerFidget( )

If the source fidget is a Java applet, it would be expected that the source fidget could simply fire the event normally and generate a JavaScript™ event handler. Unfortunately, current browsers do not support catching JavaBean events in JavaScript™ very well (Microsoft requires that the bean be packaged as an ActiveX control; Netscape doesn't support it at all). However, both browsers support Netscape's Live-Connect package (to some extent, at least), which lets a JAVA applet call a JavaScript™ method. So the source fidget can generate a JavaScript™ event handler and tell the applet via an HTML <PARAM> tag what the name of the event handler is. This means the applet must provide one parameter for each event that it fires. For example, an applet called treeView:
<script language="JavaScript">
function treeView_onSelectNode (e)
{
document.docView.document=e.getNode( );
}
</script>
<applet name="treeView" code="TreeView" codebase="/test" width="300" height="100" mayscript>
<param name="JSSelectNodeHandler" value="treeView_onSelectNode">
</applet>
The applet must include code to check for this HTML parameter and call the appropriate event handler:

import netscape.javascript.*;
String strJSSelectNodeHandler=this.getParameter ("JSSelectNodeHandler");
if (strJSSelectNodeHandler !=null &&
strJSSelectNodeHandler.length( ) <1)
strJSSelectNodeHandler=null;
JSObject jswin=null;
if (strJSSelectNodeHandler !=null)
{
this.jsWin=JSObject.getWindow (this);
Object args[ ]={ new SelectNodeEvent ( . . . ) };
this.jsWin.call (strJSSelectNodeHandler, args);
}
If the source fidget is also a JavaScript™ fidget, it generates code to set the appropriate properties or call the appropriate methods for an event target, as:
// in some method of treeView, want to fire event
docView.document=node
var args={"text38 :node}
statusBar.show (args) Note that user events are not the same as normal JavaScript™ events (low-level events). Typically a user event will be triggered by a low-level event; in that case, the JavaScript™ event handler for the low-level event should call the appropriate user event targets. As a convenience, the fidget context object defines a renderEventJS ( ) method which the fidget can call to create properly formatted JavaScript code to fire a user event.

c. Java Applet

If the event target is on the same page and is a JAVA applet, and the source fidget is a JavaScript™ fidget, the source fidget simply sets the appropriate applet properties and calls its methods, as:
// in some method of treeView, want to fire event
document.docViewApplet.document=node document.statusBarApplet.show (node)

If the source fidget is also a JAVA applet, the situation is more complicated. Again, the ideal would be for the applet to simply fire a JavaBean event to the target applet in the normal manner. However, the JavaBean™ event model places the responsibility for "connecting" on the target, which must register a listener with the source; whereas the present model puts the responsibility on the source. The present model is centered around design-time binding of events (the deployer specifies the event handler declaratively), whereas the JavaBean model assumes compile-time binding (the target author writes an event handler for every event expected to be received).

The JavaBean™ event model can still be used in this instance, but the source applet would effectively have to tell the target applet what to do; the target applet would have to expose a setEventTarget ( ) method which would accept a generic EventTarget object and register a generic event handler which would dynamically set properties and invoke methods based on the event target.

A simpler alternative would be for the event target itself to do the dispatching via the JAVA reflection API; then the target applet does not have to do anything, and the source applet need only tell the event target to dispatch itself when it fires the event.

In either case, the source applet must expose a parameter for each event it fires whose value is a string of the syntax described above. This lets the fidget generate an HTML <PARAM> tag for each event at render time.

12. Deploying Fidgets

The task of the deployer is to create JSP pages, add HTML content, and embed fidgets in them. The deployer creates a JSP and adds HTML content to it in the usual fashion. Since fidgets may comprise JavaBeans, the deployer may embed a fidget on a JSP by using the standard <jsp:useBean> tag. The deployer can set the initial properties of the fidget using <jsp:setProperty> tags inside the body of the <jsp:useBean> tag, or by using a JSP scriptlet. The deployer can call methods on the fidget when it is first instantiated by using a JSP scriptlet inside the body of the <jsp:useBean> tag. All of the foregoing is normal JSP syntax.

The present invention imposes certain requirements on the deployer, if using JSP, as follows:

1. The deployer must include the JSP <% @ page %> directive and must specify the import="<fidget context and fidget bean classes>" and extends="FidgetJspSuper" attributes.
2. The deployer must set the fidget ID property of each fidget.
3. The deployer must include the following JSP declaration and scriptlet after instantiating all the fidgets she plans to use on the page, but before rendering any HTML or other text to the JSP response object:
   <%
   JspFidgetContext fc=getFidgetContext (request);
   fc.init (pageContext);
   %>
4. The deployer must insert the JSP scriptlet <% fc.renderFidget("fidgetname") %> for each fidget to include the HTML rendering of the fidget in the appropriate place on the page.

The foregoing requirements may be reduced further by using custom JSP tags.

A custom JSP tag may be defined to instantiate a fidget and set its ID. However, this method may not be acceptable, as the JSP engine will presumably not give it the same semantics as the <jsp:useBean> tag and because builder tools may not recognize it.

A custom JSP tag may be defined to render a fidget, instead of requiring the deployer to call FidgetContext.renderFidget ( ). Ideally, the fidget can be instantiated and rendered with a single tag. However, this would prevent the fidget context from caching the entire page (it could still cache a fidget's rendering). This would also make it much more difficult for fidgets to "cooperate" by automatically setting up event targets for each other.

A custom JSP tag may be defined to obtain the fidget context and call its init ( ) method.

A custom JSP tag may be defined to insert the appropriate styles.

A simple JSP using fidgets is shown below. Text which is specific to the invention is in bold.

<% @ page language="java" import="<fidget context and fidget
bean classes>"extends="FidgetJspSuper"%>
<!—Create a fidget bean and initialize some properties—>
<jsp:useBean id="fidget1" class="Fidget1Bean"scope="request">
<jsp:setProperty name="fidget1" property="fidgetID" value="fidget1" />
<jsp:setProperty name="fidget1" property=prop1"value="100"/>
<jsp:setProperty name="fidget1" property="prop2"value="abcdef"/>
</jsp: useBean><!- - Create another fidget bean -->
<jsp:useBean id="fidget2" class="Fidget2Bean" scope="session">
<jsp:setProperty name="fidget2" property="fidgetID"value="fidget2"/>
</jsp:useBean><!-- Create the fidget context and tell it to process event targets and check --><!-- whether the page is cached. If so, init ( ) returns true and we're done. -->
<
JspFidgetContext fc=getFidgetContext (request);
fc.init (pageContext);
>
<html>
<body>
<!-- Some arbitrary HTML code . . . -->
<table>
<tr><td>
<!-- Tell the fidget context to render the fidgets in the appropriate places -->
<% fc.renderFidget ("fidget1"); %>
</td><td>
<% fc.renderFidget ("fidget2"); %>
</td></tr>
</table>
<body>
</html>

Note that JSP is not the only conceivable mechanism for displaying fidgets. An advanced deployer or an extender could, for example, write one or more servlets, ASP pages, or even custom server extensions or CGI scripts, to host fidgets. As long as the host is capable of instantiating a JavaBean, directly or via a bridge, all the mechanisms discussed herein will operate.

A deployer who is not using JSP has some additional requirements, however. A deployer using a servlet must do the following:

1. Instantiate a fidget context object, passing the servlet request and response objects to the constructor. The response object should be a FidgetServletResponse object if page caching is to be used.
2. Call the fidget context's setPageID( ) method to tell it what the current "page" is.
3. Instantiate fidgets as desired. For each fidget, call the fidget's setFidgetID ( ) method, and call the fidget context's addFidget( ) method.
4. Call the fidget context's setLocale( ) method to set the appropriate locale for the user.
5. Call the fidget context's doEvent ( ) method to invoke the appropriate actions on event targets.
6. Call the fidget context's isPageCached ( ) method, if page caching is desired.
7. Call the fidget context's renderFidget ( ) method for each fidget at the appropriate point.
8. Call the fidget context's commitCache( ) method after the page has been completely rendered, if page caching is desired.

A deployer who is not using a servlet must do the following:

1. Instantiate a fidget context object.
2. Call the fidget context's setPageID( ) method to tell it what the current "page" is.
3. Instantiate fidgets as desired. For each fidget, call the fidget's setFidgetID ( ) method, and call the fidget context's addfidget( ) method.
4. Call the fidget context's doEvent ( ) method and pass the request parameters as a Map.
5. Call the fidget context's getCachedPage( ) method, if page caching is to be used; if the result is not null, return it to the client.

6. Call the fidget context's renderPidget ( ) method for each fidget at the appropriate point.
7. Buffer the page as it is rendered, if page caching is desired.
8. Call the fidget context's commitCache( ) method after the page has been completely rendered, supplying the buffered page, if page caching is desired.

13. Deployer Tools

A deployer can create a JSP with fidgets using only a simple text editor, following the JSP specification and the guidelines above. However, this is closer to programming than many deployers may feel comfortable with, and it requires the deployer to follow the JSP syntax rules, which are not terribly intuitive even to an experienced programmer.

The JSP Specification describes design tools which enable deployers to create and edit JSPs visually, without having to worry about the syntax, the way a WYSIWYG word processor frees the user from having to worry about embedding formatting commands in a document. Since a JSP can include arbitrary HTML, the design tool must be capable of handling all the HTML tags. Since the JSP Specification allows embedding JavaBeans in a JSP, the design tool must also be capable of handling JavaBeans. Since a fidget is a type of JavaBean, the design tool can be used to add fidgets to or remove fidgets from a JSP and to edit their properties.

An embodiment of the present invention may provide mechanisms to extend various JSP design tools so as to simplify the process of embedding the JSP scriptlets which render fidgets and to automatically include the fidget context bean and make the required calls to it for page caching, event handling, and the like.

14. Fidget Editors

Since fidgets are JavaBeans, they may use the methods of providing customized builder tools described in section 9 of the JavaBeans™ Specification version 1.01 —property editors and customizers. These will be invoked by a bean-aware builder tool to provide a GUI with which a deployer can set fidget properties. The term "fidget editor" is used to refer either to a fidget's customizer or the set of property pages and property editors which the builder tool exposes for a fidget.

The FidgetAdapter class provides property editors for the theme property and for simple event targets (ones without event properties). The other common fidget properties are either trivial (fidgetID) or should not be set at design time anyway (fidgetContext). An individual fidget may provide property editors for its own custom properties and event targets, and may also provide a customizer to present a more unified UI to the deployer. A customizer may use the default property editors provided (theme and event target).

Event target property editors must be able to browse through the JSP pages and the fidgets on each page, and should also support targeting the standard URLs for rendering an object, invoking an action on an object, and calling a method on an extension server. Custom event target property editors should also be able to list the event properties and insert their names as values of the various target elements. An abstract class AbstractEventTargetPropertyEditor and a concrete implementation, SimpleEventTargetPropertyEditor, can be provided which include basic functionality. A fidget which defines events with custom properties should implement a subclass of this to provide access to these properties.

In order to be able to browse JSP pages and fidgets, an event target property editor must somehow obtain information about the available JSP pages and the fidgets on the page. If the JSP page belongs to a Web application, as defined in the servlet 2.2 specification, the fidget editor can read the web.xml deployment descriptor to find out what JSP pages are available; it could then scan each JSP page looking for <jsp:useBean> tags. Such a method is not very elegant or efficient, and will not work if there is no deployment descriptor (e.g., how do we find the deployment descriptor, if we have no idea where the current page is?).

Any alternative, however, requires either that the deployer perform a separate action for each JSP and fidget to register its existence with some global directory, or else that each fidget have a customizer which performs this registration automatically, and that each page have a similar "customizer", which is complicated since pages are not beans. Unfortunately, the JavaBeans Specification version 1.01 provides no means for a customizer to obtain any information about its container. The BeanContext object as defined in the Extensible Runtime Containment and Server Protocol Specification version 1.0 might allow this, but it would be up to the builder tool to implement this specification and to provide information about the current page.

Therefore, the deployer must be asked (via the customizer) what the current page is. The customizer can give the deployer a choice of already known pages from information stored in a design time repository. It can then add its own fidget ID to that page ID in the repository.

It should be appreciated that the above described implementation of the invention is provided herein as an example only, and other standards which are known or to be developed may be used to implement the invention.

It should now be appreciated that the present invention provides an improved and more flexible event model. In particular, it should be appreciated that the present invention provides an advantageous event model where the event actions are expressed using fixed-format text strings in a declarative fashion, as well as a method for setting the event target property for a user event without the need to recompile software.

Although the invention has been described in connection with various illustrated embodiments, numerous modifications and adaptations may be made thereto without departing from the spirit and scope of the invention as set forth in the claims.

What is claimed is:

1. A method of handling computer related user events using software components, comprising the steps of:

receiving at a server a user request for a first server page (SP), said SP containing a source software component which identifies an event target property;

rendering the source software component at the server;

outputting the rendered source software component to a user's browser for display as part of a web page, said rendered source software component identifying a second SP having one or more target software components;

providing for the selection of the second SP;

receiving the selection at the server;

searching request parameters of the source software component to locate event target parameters of the source software component at the second SP;

executing event target parameters of the source software component at the second SP located during said searching step by setting an event property or invoking a method for each target software component of the second SP based on the event target parameters of the source software component; and rendering the one or more target software components at the server for output to a user's browser;

wherein the event target property of the source software component corresponds to a user event, said event target property being expressed using text strings.

2. A method in accordance with claim 1, wherein the text strings comprise fixed-format text strings.

3. A method in accordance with claim 1, wherein:

the source software component is rendered as hypertext markup language (HTML); and the user event comprises an HTML link.

4. A method in accordance with claim wherein:

the source software component is rendered as scripting language code; and the user event comprises one of (i) an HTTP request for the second SP, or (ii) a call to a target software component on the same page, which target software component is rendered as one of scripting language code or an applet.

5. A method in accordance with claim 1, wherein:

the source software component is rendered as an applet; and the user event comprises one of (i) an HTTP request for the second SP, or (ii) a call to a target software component on the same page, which target software component is rendered as one of scripting language code or another applet.

6. A method in accordance with claim 1, wherein:

the source software component is rendered as XML; and the user event comprises an XML Linking Language (Xlink) link to the second SP.

7. A method in accordance with claim 1, wherein the first SP and the second SP comprise one of Server Pages, servlets, other Hypertext transfer Protocol (HTTP) server plugins, or Common Gateway Interface (CGI) programs.

8. A method in accordance with claim 1, wherein the user events are implemented as events of reusable software components.

9. A computer readable medium, having thereon computer program code means for handling computer related user events using software components, including:

receiving at a server a user request for a first server page (SP), said SP containing a source software component which identifies an event target property;

rendering the source software component at the server;

outputting the rendered source software component to a user's browser for display as part of a web page, said rendered source software component identifying a second SP having one or more target software components;

providing for the selection of the second SP;

receiving the selection at the server;

searching request parameters of the source software component to locate event target parameters of the source software component at the second SP;

executing event target parameters of the source software component at the second SP located during said searching step by setting an event property or invoking a method for each target software component of the second SP based on the event target parameters of the source software component; and rendering the one or more target software components at the server for output to a user's browser;

wherein the event target property of the source software component corresponds to a user event, said event target property being expressed using text strings.

10. A medium in accordance with claim 9, wherein the text strings comprise fixed-format text strings.

11. A medium in accordance with claim 9, wherein:

the source software component is rendered as hypertext markup language (HTML); and the user event comprises an HTML link.

12. A medium in accordance with claim 9, wherein:

the source software component is rendered as scripting language code; and the user event comprises one of (i) an HTTP request for the second SP, or (ii) a call to a target software component on the same page, which target software component is rendered as one of scripting language code or an applet.

13. A medium in accordance with claim 9, wherein:

the source software component is rendered as an applet; and the user event comprises one of (i) an HTTP request for the second SP, or (ii) a call to a target software component on the same page, which target software component is rendered as one of scripting language code or another applet.

14. A medium in accordance with claim 9, wherein:

the source software component is rendered as XML; and the user event comprises an XML Linking Language (Xlink) link to the second SP.

15. A medium in accordance with claim 9, wherein the first SP and the second SP comprise one of Server Pages, servlets, other Hypertext transfer Protocol (HTTP) server plugins, or Common Gateway Interface (CGI) programs.

16. A medium in accordance with claim 9, wherein the user events are implemented as events of reusable software components.

\* \* \* \* \*

UNITED STATES PATENT AND TRADEMARK OFFICE
CERTIFICATE OF CORRECTION

PATENT NO. : 6,772,408 B1  Page 1 of 1
DATED : August 3, 2004
INVENTOR(S) : Velonis et al.

It is certified that error appears in the above-identified patent and that said Letters Patent is hereby corrected as shown below:

<u>Column 25,</u>
Line 16, after the word "claim", insert -- 1 --

Signed and Sealed this

Twelfth Day of October, 2004

JON W. DUDAS
*Director of the United States Patent and Trademark Office*